US009777196B2

(12) United States Patent
Thibault et al.

(10) Patent No.: US 9,777,196 B2
(45) Date of Patent: Oct. 3, 2017

(54) FLUID ACTIVATABLE ADHESIVES FOR GLUE-FREE, LINER-FREE, LABELS FOR GLASS AND PLASTIC SUBSTRATES AND METHODS OF USE THEREOF

(71) Applicant: NuLabel Technologies, Inc., East Providence, RI (US)

(72) Inventors: Raymond Thibault, Wrentham, MA (US); Heidi Munnelly, Cumberland, RI (US)

(73) Assignee: NuLabel Technologies, Inc., East Providence, RI (US)

( * ) Notice: Subject to any disclaimer, the term of this patent is extended or adjusted under 35 U.S.C. 154(b) by 0 days.

(21) Appl. No.: 14/978,888

(22) Filed: Dec. 22, 2015

(65) Prior Publication Data

US 2017/0174953 A1    Jun. 22, 2017

(51) Int. Cl.
*C09J 7/02*    (2006.01)
*C09J 133/06*    (2006.01)
(Continued)

(52) U.S. Cl.
CPC ............ *C09J 7/042* (2013.01); *C08F 222/06* (2013.01); *C08L 25/08* (2013.01); *C09J 5/00* (2013.01); *C09J 125/08* (2013.01); *C09J 133/08* (2013.01); *C09J 133/10* (2013.01); *C09J 133/24* (2013.01); *C09J 2201/614* (2013.01); *C09J 2203/334* (2013.01); *C09J 2205/114* (2013.01); *C09J 2400/283* (2013.01); *C09J 2433/00* (2013.01); *Y10T 156/1798* (2015.01); *Y10T 428/2813* (2015.01); *Y10T 428/2891* (2015.01)

(58) Field of Classification Search
None
See application file for complete search history.

(56) References Cited

U.S. PATENT DOCUMENTS 3,296,018 A    1/1967  Sullivan
3,296,723 A    1/1967  Johannes
(Continued)

FOREIGN PATENT DOCUMENTS

DE    3508150    10/1985
DE    29902548    5/1999
(Continued)

OTHER PUBLICATIONS

Database WPI, Thomson Scientific, XP-002743905, 2 pages.
(Continued)

*Primary Examiner* — Frank D Ducheneaux
(74) *Attorney, Agent, or Firm* — Pabst Patent Group LLP (57) ABSTRACT

A fluid activatable adhesive for a liner-free label and methods of using are described. Preferably, the adhesive composition includes a polymer, such as an emulsion polymer formed from monomers selected from the group consisting of butyl acrylate, 2-ethylhexyl acrylate, methyl acrylate, 2-acrylamido-2-methylpropane sulfonic acid (AMPS), a salt of AMPS, such as its sodium salt, styrene, and combinations thereof. The adhesive composition adheres to the liner-free label to the surface of a substrate that is at room temperature, at room temperature and wet, cold, or cold and wet. In preferred embodiments, the substrate is glass or plastic, such as polyethylene terephthalate.

20 Claims, 1 Drawing Sheet (51) Int. Cl.
*C09J 133/10* (2006.01)
*C09J 133/24* (2006.01)
*C09J 125/08* (2006.01)
*C08L 25/08* (2006.01)
*C08F 222/06* (2006.01)
*C09J 7/04* (2006.01)
*C09J 133/08* (2006.01)
*C09J 5/00* (2006.01)

(56) References Cited

U.S. PATENT DOCUMENTS

| | | |
|---|---|---|
| 3,351,515 A | 11/1967 | Muttera, Jr. |
| 3,531,316 A | 9/1970 | Sternasty |
| 4,507,670 A | 3/1985 | Motosugi |
| 4,820,773 A | 4/1989 | Alexander |
| 6,020,062 A | 2/2000 | Questel |
| 6,210,795 B1 | 4/2001 | Nelson |
| 6,298,894 B1 | 10/2001 | Nagamoto |
| 6,306,242 B1 | 10/2001 | Dronzek |
| 6,517,664 B1 | 2/2003 | Dronzek, Jr. |
| 6,656,319 B1 | 12/2003 | Boyd |
| 6,663,746 B2 | 12/2003 | Dronzek |
| 7,122,597 B2 | 10/2006 | Calienni |
| 7,943,714 B2 | 5/2011 | Schnieders |
| 8,334,335 B2 | 12/2012 | Lux |
| 8,334,336 B2 | 12/2012 | Lux |
| 8,716,372 B2 | 5/2014 | Lux |
| 8,716,389 B2 | 5/2014 | Lux |
| 8,840,994 B2 | 9/2014 | Cho |
| 9,109,144 B2 | 8/2015 | Cho |
| 9,254,936 B2 | 2/2016 | Cho |
| 2002/0151628 A1 | 10/2002 | Dheret |
| 2004/0038026 A1 | 2/2004 | Li |
| 2005/0284566 A1 | 12/2005 | Wagner |
| 2007/0119542 A1 | 5/2007 | Williams |
| 2008/0060756 A1 | 3/2008 | Schnieders |
| 2009/0136773 A1 | 5/2009 | Ghosh |
| 2009/0169780 A1 | 7/2009 | Kimura |
| 2009/0226728 A1* | 9/2009 | Onoe ............... C08F 255/00 428/413 |
| 2009/0288759 A1 | 11/2009 | Topfer |
| 2011/0033698 A1 | 2/2011 | Woods |
| 2012/0059103 A1 | 3/2012 | Lux |
| 2013/0034726 A1 | 2/2013 | Lux |
| 2014/0045976 A1 | 2/2014 | Lux |
| 2014/0190631 A1 | 7/2014 | Cho |
| 2015/0310773 A1 | 10/2015 | Cho |
| 2016/0104396 A1 | 4/2016 | Cho |

FOREIGN PATENT DOCUMENTS

| | | |
|---|---|---|
| DE | 29902549 | 5/1999 |
| DE | 19852008 | 5/2000 |
| DE | 19905468 | 7/2000 |
| DE | 19962582 | 7/2000 |
| EP | 267619 | 5/1988 |
| EP | 312037 | 4/1989 |
| EP | 503112 | 9/1992 |
| GB | 1333710 | 10/1973 |
| JP | 2004240029 | 8/2004 |
| WO | 9919412 | 4/1999 |
| WO | 0214448 | 2/2002 |
| WO | 0245054 | 6/2002 |
| WO | 2006000424 | 1/2006 |
| WO | 2007077036 | 7/2007 |
| WO | 2009024357 | 2/2009 |
| WO | 2012109140 | 8/2012 |
| WO | 2012109148 | 8/2012 |
| WO | 2014109983 | 7/2014 |

OTHER PUBLICATIONS

International Preliminary Report on Patentability and Written Opinion for PCT/US2014/010327 dated Jul. 14, 2015.
International Search Report and Written Opinion for PCT/US2012/023964 dated Mar. 18, 2013.
International Search Report and Written Opinion for PCT/US2012/023982 dated Mar. 11, 2013.
International Search Report and Written Opinion dated Sep. 11, 2015 in connection with PCT application, PCT/US2015/037000.
International Search Report for PCT/US2014/010327 dated Jan. 27, 2015.

* cited by examiner

FLUID ACTIVATABLE ADHESIVES FOR GLUE-FREE, LINER-FREE, LABELS FOR GLASS AND PLASTIC SUBSTRATES AND METHODS OF USE THEREOF

FIELD OF THE INVENTION

This invention is in the field of automated labeling systems for glass and plastic substrates, such as containers for food, beverages, or pharmaceuticals.

BACKGROUND OF THE INVENTION

Plastic and glass containers or bottles are prevalent in a wide variety of shapes and sizes for holding many different types of materials such as detergents, chemicals, motor oil, beverages, etc. These containers are glass or plastic (mono or multi layers) of polyethylene, polypropylene, polyester or vinyl along with other specialty blends for specific barrier and product resistance performance. These containers are typically provided with a label which designates the trade name of the product and may contain other information.

Labels designed to adhere to glass and/or polyethylene terephthalate (PET) are typically applied using a cold or hot glue application processes. During the automated bottle labeling, glue (high viscosity, tacky liquid) is directly applied to the preprinted label and then applied to the bottle. The use of glues, however, requires extensive cleaning as the glue dries and accumulates on the bottling line equipment. In some cases, the glue must be heated prior to application, which requires additional heating equipment and increases energy costs.

In addition to cold- and hot-glue applied labeling methods, preprinted pressure sensitive adhesive (PSA) labels are also used. These labels utilize a release liner to protect the preprinted label face from interacting with the tacky PSA. The use of traditional PSA labels results in several million pounds of liner waste per year in the bottling industry. PSAs also lack removability properties desirable in downstream recycling and bottle reusing facilities.

Attempts to overcome these limitations have been described in the literature. U.S. Pat. Nos. 6,306,242; 6,517,664; and U.S. Pat. No. 6,663,746 to Dronzek describe a labeling system for applying labels to plastic and glass bottles. The labeling system includes applying a layer of a hydrophilic solid material to a polymeric label to form a hydrophilic layer on the polymeric label; applying water, water containing a cross-linking agent or a water based adhesive over the hydrophilic layer to form a fastenable polymeric label; fastening the fastenable polymeric label to a glass, plastic or metal container or surface; and curing the polymeric label on the glass, plastic or metal surface or container.

U.S. Pat. No. 7,943,714 to Schneiders describes a labeling system containing a blend of two or more polymers having different hydrophilicities or using a polymer with repeat units having carboxylic, sulfonic or phosphonic acid groups and/or their salts.

Dronzek and Schneiders require the use of non-porous or relatively non-porous face sheets, such as polypropylene, high/low density polyethylene, polyethylene terephthalate, polystyrene, polycarbonate, vinyl and compatibilized blends. Face sheets prepared from these materials typically have a moisture vapor transmission rate of less than about 150 $g/m^2/24$ hr as measured using the TAPPI T448 om-09 standard protocol. In fact, Schneiders discloses that the use of porous face sheets, i.e., those having high moisture vapor transmission rates (MVTR) values, with pressure sensitive adhesives is undesirable because the finished labels exhibit poor wet tack and swimming. Similar disadvantages are described in Dronzek.

Another challenge with PSAs is their application to substrates that are cold and/or wet. PSAs need an initial adhesion or tack to a substrate, followed by the application of pressure to increase the level of the initial adhesion. However, cold temperatures cause PSAs to become firm thereby losing initial tack, and a wet surface prevents the PSA from attaching due to repression of the tack, causing the label to slide off its point of application. Substrates that are cold and/or wet are frequently encountered in the bottling industry where beverages poured into a bottle are cold, causing the bottle to also become cold, and wet due to condensation.

There is a need for labels, particularly for face sheets with high MVTR values that can be applied to a substrate such as glass or PET at variable temperatures and humidity levels. Further, there exists a need for a liner-free labeling system for glass and polyethylene terephthalate (PET) automated bottle labeling applications that provides both quick tack when surfaces are wet and long term label-to-bottle adhesion when dry.

Therefore, it is an object of the invention to provide improved labels that are able adhere to a substrate at a variety of temperatures and/or humidity levels.

It is a further object of the invention to provide improved compositions for adhering labels to a surface at a variety of temperatures and/or humidity levels.

It is yet a further object of the invention to provide improved methods for applying a liner-free label to a substrate.

SUMMARY OF THE INVENTION

Methods for applying a liner-free, or liner-less label, to a substrate, particularly glass or plastic (e.g., PET) substrates are described herein. The method includes applying an adhesive composition, such as a polymeric coating, to a label face sheet, activating the adhesive composition with an activating fluid, and contacting the label to the substrate. The substrate may be at a variety of different temperatures and humidity levels and the adhesive composition will still adhere to the substrate. For example, the substrate may be at room temperature (e.g. 18° C. to 25° C.), at room temperature and wet, at a cold temperature that is lower than room temperature, such as ranging from 15° C. to −5° C., or at a cold temperature and wet. In some embodiments, the substrate is at a cold temperature, such as from about 15° C. to −5° C., preferably from about 15° C. to 0° C., more preferably from about 2° C. and 4° C.

The activating fluid is preferably a mixture of water and one or more organic solvents, such as low molecular weight alcohols. In some embodiments, the face sheet has an MVTR value of at least about 160, 170, 175, 180, 185, 190, 195, or 200 $g/m^2/24$ hr.

In some embodiments, the adhesive composition contains a blend or mixture of polymers, such as homopolymers, copolymers, terpolymers, etc., and combinations thereof. Preferably, the adhesive composition includes a polymer, such as an emulsion polymer containing 2-acrylamido-2-methylpropane sulfonic acid (AMPS), a salt of AMPS, such as its sodium salt, or a combination thereof. Optionally, the emulsion polymer contains one or more additional monomers, such as butyl acrylate, 2-ethylhexyl acrylate, methyl acrylate, styrene, or a combination thereof. In preferred embodiments, AMPS, its sodium salt, or combinations thereof, forms between about 1.0% wt/wt and about 45.0% wt/wt of the polymer, more preferably between about 10.0% wt/wt and about 25.0% wt/wt of the polymer, most preferably between about 10.0% wt/wt and about 20% wt/wt, such as 10.0% wt/wt, 11.0% wt/wt, 12.0% wt/wt, 13.0% wt/wt, 14.0% wt/wt, 15.0% wt/wt, 16.0% wt/wt, 17.0% wt/wt, 18.0% wt/wt, 19.0% wt/wt, and 20.0% wt/wt.

In a preferred embodiment, the adhesive composition is non-blocking when dry, even in the absence of a non-blocking resin.

In other embodiments, the adhesive composition contains an emulsion polymer which provides adhesion to the substrate and optionally a non-blocking resin in a continuous film that provides a non-block surface. The adhesive composition may be in the form of a blend of the emulsion polymer and the non-blocking resin. Blending the emulsion polymer into the non-blocking resin disrupts the polymer film and allows for improved activation of the film by the activation spray.

The moderate to high acid number of the resin provides the base solubility needed to allow for the use of a water-based solution combined with the caustic removability. The higher acid number allows for ice water resistance as well. Lower acid number resins typically have less resistance to ice water, especially over longer durations, such as 24-72 hours or longer.

In other embodiments, the adhesive composition contains one or more polymers containing at least two monomers with different hydrophilicities. The more hydrophilic monomer is referred to as "the hydrophilic monomer" and the more hydrophobic monomer is referred to as "the hydrophobic monomer". The hydrophilic and hydrophobic monomers are selected to allow the at least one hydrophilic monomer to have a characteristic of quick tack when exposed to a hydrophilic solvent, such as water or other aqueous solvent, while the at least one hydrophobic monomer has a characteristic which enables strong adhesion to a paper or polymeric substrate. Alternatively, independent polymers with hydrophilic and hydrophobic functionality can be blended in various ratios yielding polymeric mixtures with hydrophobic and hydrophilic functionality.

The adhesive composition may contain hygroscopic particulate fillers which enable fast exhaustion of the activation fluid out of the adhesive when applied to a substrate. This allows the hydrophobic monomers of the adhesive composition to achieve a strong adhesive bond between the face sheet and substrate. The particulate fillers may also provide fast absorption of the activation fluid composition into the full thickness of the adhesive composition and rapid swelling of not only the hydrophilic part, but also the hydrophobic part, of the adhesive composition. The particulate fillers may also function as anti-blocking agents when liner-free label media are tightly wound in a roll or stacked.

The compositions described herein can quickly convert from a non-tacky to a tacky state, when contacted with an activating fluid, enabling the use of solvent-activated glue-free, liner-free labels for label printing and labeling that require both quick tack and strong adhesion. The activating fluid is non-tacky, dries clean, and requires no additional maintenance or clean up, e.g., to remove glue from the labeling machinery. The ability of the non-tacky adhesive layer to be applied before, during, or after label printing allows for flexibility in the work flow and customization of the system. Further, applying the adhesive layer as a coating during the printing of the label provides manufacturing efficiencies resulting in waste and cost reduction. In certain embodiments, the adhesive is engineered to be compatible with application methods that are typically used to print labels. This includes, but is not limited to, flexographic, gravure, and offset printing methods. The resulting system allows a standard printing press to be able to both print colors and coat adhesive onto a web or sheet label in a single pass.

The adhesive compositions described herein may be used not only on paper, cardboard, particle board, medium density fiberboard, wood, manufactured wood products, and metal substrates, but also on glass and plastics commonly used in commercial applications including, but not limited to, polyethylene terephthalate (PETE, PET, PETG), polyethylene (PE), polystyrene (PS), low-density polyethylene (LDPE), linear low-density polyethylene (LLDPE), high density polyethylene (HDPE), polypropylene (PP), polyester, polyvinyl chloride (PVC) and polyvinyl chloride films, and TYVEK®, as well as other low energy and thermoplastic substrates.

After the adhesive composition is applied to label face sheet, the performance of the adhesive can be evaluated using a variety of assays including block resistance, room temperature quick tack, cold bottle quick tack, peel strength and percent fiber tear at 2 and 10 minutes, and tunneling and/or swimming when immersed in an ice bath for 24 hours to 72 hours. The performance of the adhesive in the peel strength and immersion assays can vary depending on the activating fluid used to activate the adhesive.

In some embodiments, the adhesive composition on the label provides fair, good, or excellent, preferably good or excellent, blocking resistance (room temperature or heat seal) and/or pressure blocking resistance; fair, good, or excellent, preferably good or excellent, room temperature quick tack; fair, good, or excellent, preferably good or excellent, cold temperature quick tack; fair, good, or excellent, preferably good or excellent, peel strength on PET and/or glass when activated by a cosolvent and/or water; and/or resists swimming, tunneling, and/or edge lifting for at least 20 minutes, 1 hour, or two hours and up to 12 hours, 24 hours or 48 hours when immersed in an ice water bath. In a preferred embodiment, the adhesive composition on a label provides good or excellent room temperature/pressure blocking and good or excellent cold temperature quick tack. In another preferred embodiment, the adhesive composition on a label provides good or excellent room temperature/pressure blocking and good or excellent cold temperature quick tack, and adheres the label to a substrate for greater than 24 hours in an ice water bath without swimming, tunneling, or edge lifting.

The assays described herein qualitatively or quantitatively describe the performance characteristics of the adhesive compositions.

In some embodiments, the adhesive compositions, when activated by a suitable activating fluid, such as a mixture of water and one or more organic solvents (e.g. low molecular weight alcohols), show good or excellent room temperature quick tack to a substrate, when the surface of the substrate to which the adhesive composition is applied is dry or wet. In other embodiments, the adhesive compositions show good or excellent room temperature quick tack and cold bottle quick tack to a substrate, when the surface of the substrate to which the adhesive composition is applied is dry or wet. In preferred embodiments, the adhesive compositions show good or excellent room temperature non-blocking to a substrate, such as the uncoated side of a face sheet, when the adhesive composition and the surface of the substrate to which the adhesive composition is applied are dry. In the most preferred embodiments, the adhesive compositions show all of (i) good or excellent room temperature non-blocking to a substrate, such as the uncoated side of a face sheet, when the adhesive composition and the surface of the substrate to which the adhesive composition is applied are dry, (ii) room temperature quick tack to a substrate, when the surface of the substrate to which the adhesive composition is applied is dry or wet, and (iii) cold bottle quick tack to a substrate, when the surface of the substrate to which the adhesive composition is applied is dry or wet.

In some embodiments, the peel strength of the adhesive compositions on PET and/or glass when activated by an activating fluid, such as 30% n-propanol (nPA), 30% isopropanol (IPA), or 10% nPA is greater than about 100 grams/inch within about 5 minutes of application to a substrate, preferably greater than about 200 grams/inch within about 2 minutes of application to a substrate, more preferably greater than about 200 grams/inch within about 1 minute of application to a substrate. The activating fluid then distributes into the hydrophobic regions resulting in their swelling and ultimate adhesion to the substrate. This adhesion to the substrate results in average peel test values in the range from about 100 grams/inch to about 1,000 grams/inch, preferably from about 200 grams/inch to about 1,000 grams/inch, more preferably from about 400 grams/inch to about 1,000 grams/inch.

Alternatively, the adhesive can be evaluated using the fiber tear test. In some embodiment, the labels exhibit a paper tear greater than about 50, 55, 60, 65, 70, 75, 80, 85, 90, or 95% after one, two, three, four, five, six, seven, eight, nine, or 10 minutes or longer. In particular embodiments, the labels exhibits a paper tear greater than 60, 65, 70, 75, 80, 85, 90, or 95% after two minutes and 10 minutes. These tear strengths can be achieved using paper-based or polymer or synthetic based face sheets. However, these tear strengths are often unnecessarily high for polymer and synthetic based face sheets.

Kits containing the adhesive formulations are also described herein. The kit can contain only the adhesive formulation. The kits can contain the adhesive formulation and uncoated labels. The kits can contain paper or synthetic (polymeric film) labels which have been coated with the adhesive formulation and the activating fluid. The kits can contain coated labels, activating fluid, and an activation apparatus used to apply the activating fluid to the solvent-sensitive adhesive layer.

The compositions, methods, and kits described herein offer significant ecological benefits compared to the prior art as well as products currently commercialized in particular markets. For example, the compositions, methods, and kits described herein eliminate the liner backing which is a waste byproduct of liner-backed pressure sensitive adhesive labels. This reduces landfill waste and eliminates the energy and carbon emissions from the production of liner backing and the shipment of the material to suppliers and customers.

The labeling system described herein provides labels which exhibit sufficient peel strength to glass and/or plastics, such as PET, and removability properties which are desirable in downstream recycling and bottle reusing facilities. Further, the labels exhibit sufficient peel strength to glass and/or plastics, such as PET, when the temperature of the glass or plastics, such as PET, is room temperature or a cold temperature (e.g. from 15° C. to −5° C.) and the surface of the glass or plastic, such as PET, is dry or wet.

BRIEF DESCRIPTION OF THE DRAWINGS

As shown in FIG. 1, the printable layer and the adhesive layer are on different sides of the face sheet.

As shown in FIG. 2, the label is attached to the substrate via the adhesive layer.

DETAILED DESCRIPTION OF THE INVENTION

I. Definitions

"Hydrophilic", as used herein, refers to one or more monomers or polymers (e.g., homopolymers or copolymer) in the adhesive composition or mixture having a greater affinity for water than one or more other monomers or polymers (e.g., homopolymers or copolymer) in the adhesive composition or mixture. Hydrophilicity can be quantified by measuring its partition coefficient between water (or a buffered aqueous solution) and a water-immiscible organic solvent, such as octanol, methylene chloride, or methyl tert-butyl ether. If after equilibration a greater concentration of the compound is attained in water than in the organic solvent, then the compound is considered hydrophilic. Hydrophilicity can also be evaluated using water contact angle. Generally, hydrophilic surfaces exhibit a water contact angle of less than about 90°.

"Hydrophobic", as used herein, refers to one or more monomers or polymers (e.g., homopolymers or copolymer) in the adhesive composition or mixture having less affinity for water than one or more other monomers or polymers (e.g., homopolymers or copolymer) in the adhesive composition or mixture. Hydrophobicity can be quantified by measuring its partition coefficient between water (or a buffered aqueous solution) and a water-immiscible organic solvent, such as octanol, methylene chloride, or methyl tert-butyl ether. If after equilibration a greater concentration of the compound is attained in the organic solvent than in water, the compound is considered hydrophobic. Hydrophobicity can also be evaluated using water contact angle. Generally, hydrophobic surfaces exhibit a water contact angle of greater than about 90, 95, 100, 105, or 110°.

"Tack" or "quick tack", as used herein, refers to instantaneous or nearly instantaneous formation of a bond between an adhesive and surface when brought into light contact for a very short period, e.g., less than one second. Tack properties are dependent, at least in part, on the viscoelastic flow characteristics of the polymer adhesive system. In a system where a volatile solvent-based activation method is being employed, it is possible for the system to possess initial tack when the adhesive is in a moist state and no tack (but still be well adhered to a substrate through adhesive bonding) once the moisture has evaporated or been removed. Tack is particularly relevant where bonds must immediately sustain forces after assembly. Tack forces are particularly significant in maintaining bond strength to low surface energy substrates when chemical or mechanical bonding processes do not readily occur. Tack measurement methods are typically application specific, however the Standard Test Method for Tack of Pressure-Sensitive Adhesives by Rolling Ball (D3121-06) as developed by the American Society for Testing and Materials (ASTM) provides a reliable measurement method. In this method a ball of a fixed size is rolled down a ramp of a fixed height and propelled onto a tacky label. The distance the ball travels across the label provides a measure of tack. "No tack" or "non-tacky" means that there is no such instant contact bond or adhesion between the adhesive and the substrate.

"Blocking" refers to the formation of a bond between the adhesive layer of the label and the face of an adjacent label when the label is in roll or stacked form.

"Adhesion" or "adhesive bonding", as used herein, refers to the longer term bond between the adhesive and the substrate and/or another adhesive. Adhesion, unlike tack, focuses on the bond created between a surface and a substrate (which can also be another adhesive) that is not dependent upon the viscoelastic flow characteristics of the adhesive.

Good adhesive tack (the combination between adhesion and tack) is achieved when the adhesive strength is greater than the cohesive strength of the adhesive system. A bond of adequate strength can be formed and maintained using adhesive forces, tack forces, or a combination of the two; however, bond formation is not limited by these forces. Peel strength is a force measure of both tack and adhesive forces. ASTM Standard D3330 (Standard Test Method for Peel Adhesion of Pressure-Sensitive Tape) provides an accurate measure of peel strength. For a particular substrate, average peel test values range from about 100 grams/inch to about 1,000 grams/inch, preferably from about 200 grams/inch to about 1,000 grams/inch, more preferably about 400 grams/inch to about 1,000 grams/inch to achieve adequate adhesion.

"Open time" as used herein, refers to the amount of time between the activation of the adhesive and the application of the label to a substrate.

"Resin", as used herein, generally refers to polymeric solutions that consist of a single phase, as in a solution of the polymer dissolved in a solvent. When cast into a film, these materials can form a continuous phase as the solvent evaporates.

"Emulsion/dispersion polymer", as used herein, generally refers to liquids consisting of a continuous aqueous phase in which polymeric particles are distributed. The term "emulsion" is used to refer to such solutions where the polymer is dispersed as a liquid or in a high flow/soft state. In contrast, dispersions refer to such solutions in which the polymer is dispersed as a hard solid. When the film is cast, the polymeric particles can coalesce to form a continuous film or remain as discreet particles.

"Non-blocking", as used herein, generally refers to the property of a polymeric film to show no tendency to form a bond between the adhesive layer of the label and the top of an adjacent label when the label is in roll or stacked form.

"Acid number", as used herein, refers to the mass of potassium hydroxide (KOH) in milligrams that is required to neutralize one gram of the polymer or polymers. The acid number is a measure of the amount of carboxylic acid groups in the polymer(s). In a typical procedure, a known amount of sample is dissolved in organic solvent and titrated with a solution of potassium hydroxide of known concentration and containing a color indicator.

"Cold temperature" refers to a temperature ranging from about 15° C. to −5° C., measured using any thermometer that is graduated to measure temperatures below and above 0° C. "Cold," as relates to a substrate, refers to a substrate at a temperature of ranging from about 15° C. to −5° C. measured as described above.

"Good" or "Excellent," as relates to room temperature quick tack or cold bottle quick tack refers to a label in which at least 80% of its length is adhered, via the disclosed adhesive composition, to the surface of a substrate after the attached label is allowed to set on the substrate for at least 60 seconds.

"Wet" in reference to the surface of a substrate, such as glass or a plastic refers to a surface with water, such as condensation, or other sources of moisture on its surface. A wet surface generally results when the surrounding air conditions are sufficiently humid to cause condensation to form on the colder surface of the substrate.

"Dry" in reference to the surface of a substrate, such as glass or a plastic refers to a surface without water or other sources of moisture on its surface.

II. Methods for Applying Glue-Free, Liner-Free Labels to Glass or Plastic Substrates Methods for applying a liner-free, or liner-less label, to a substrate, particularly glass or plastic (e.g., PET) substrates, are described herein. The method includes activating an adhesive composition on a label face sheet with an activating fluid, and contacting the label to the substrate, such that the adhesive composition is in contact with the substrate. The activating fluid is preferably a mixture of water and one or more organic solvents, such as low molecular weight alcohols.

A. Face Sheets

Unlike other water and solvent activated labels and adhesive systems, the adhesive compositions described herein can be applied to a variety of face sheets, with a variety of MVTR of the face sheet. In particular embodiments, the MVTR of the face sheet is at least about 160, 170, 175, 180, 185, 190, 195, or 200, 210, 220, 225, 230, 240, 250, 260, 270, 275, 280, 290, 300, 325, 350, 400, 425, 450, 475, 500, 525, 550, 575, or 600 g/m$^2$/24 hr as measured using TAPPI T448 om-09 standard protocol. MTVR for uncoated paper is reported at 620-670 g/m$^2$/24 hr.

Suitable face sheets include, but are not limited to, paper, coated one side paper, coated two side paper, top-coated and non-top-coated grades of direct thermal paper, thermal transfer paper, polymer films, woven and non-woven synthetic materials, wood, manufacture wood products, metal films, composite films, plastics (i.e. polyester, polypropylene, or polyethylene), metalized paper, and MYLAR® (DuPont Teijin Films). In some embodiments, the faces sheet is a laminate, such as used to apply to furniture. The face sheet for furniture lamination can be formed from any suitable laminate material, including but not limited to, wood, manufacture wood, and synthetic materials. In some embodiments, the face sheets can be printed on with a suitable printing device. In other embodiments, the adhesive side of the label can receive dye/ink/pigment from a printing device, for example, printer registration marks. In particular embodiments, the face sheet is printed or printable paper or printed or printable polymeric film.

B. Substrates

The adhesive compositions described herein can be used to adhere coated labels to a variety of substrates. Suitable substrates include, but are not limited to, paper, cardboard, particle board, medium density fiberboard, wood, manufacture wood products, and metal, glass and plastics commonly used in commercial applications including, but not limited to, polyethylene terephthalate (PETE, PET, PETG), polyethylene (PE), polystyrene (PS), low-density polyethylene (LDPE), linear low-density polyethylene (LLDPE), high density polyethylene (HDPE), polypropylene (PP), polyester, polyvinyl chloride (PVC) and polyvinyl chloride films, and TYVEK®, as well as other low energy and thermoplastic substrates. Other substrates include porous substrates, such as natural or synthetic textiles and cellulosic fiber-based substrates. In particular embodiments, the substrate is glass or plastic, particularly PET.

In some embodiments, the substrate, such as glass or PET is at room temperature; at room temperature and wet; cold; or cold and wet. In some embodiments, the substrate, such as glass or PET is at a cold temperature, such as from about 15° C. to −5° C., preferably from about 15° C. to 0° C., more preferably from about 2° C. to 4° C.

In some embodiments, the adhesive composition is designed to adhere to a single specific substrate but does not adhere to other substrates. In one embodiment, the adhesive composition has a specific strength of adhesion and/or mode of failure. For example, the adhesive bond has a lower failure point than the construct of the face sheet. In other embodiments, the adhesive is designed to adhere to a variety of substrates with little or no modification of the adhesive formulation.

The adhesive composition can be applied to the above-listed face sheets utilizing typical web coating methods including, but not limited to, knife over roll, gravure, reverse-gravure, metering rod, slot die, and air knife coating methods.

The coat weight of the adhesive composition on the face sheet is largely dependent upon the end use application of the solvent sensitive adhesive label. To reduce cost, coat weights of 3 dry grams of adhesive per square meter are typically used. However, coat weights up to 25 dry grams per square meter may be also be used. Preferred coat weight ranges between 6 dry grams of adhesive per square meter to 12 dry grams of adhesive per square meter.

After the application of the adhesive composition to the face sheet web, the remaining water and solvent is extracted from the adhesive composition. This may be accomplished using conventional methods including, but not limited to, air flotation oven, roller supported web oven, and energy cure methods (for example, infrared heaters and dryers).

Optionally, thermally activated paper and films may be coated with the adhesive composition. In these embodiments, the adhesive composition should not contain any chemistries or solvents that negatively interact with the embedded thermal dye. In addition, during the drying (or solvent removal) process, the heat or energy from the process should not activate the thermal paper (a processes known as imaging).

Sometimes the coating of a web with an adhesive composition can induce a phenomenon known as a shape memory or curling. As it is often important for end applications that labels have lay flat properties, one or more additives can be added to the adhesive formulation to prevent curl, as described earlier. Suitable curl preventing additives include, but are not limited to glycerol, ethylene glycol, propylene glycol, or polyethylene glycol (molecular weight range from 150 to 10,000). In addition, mechanical methods can be employed to reduce curl, such as a bending bar or mechanical embossing. Also, the addition of vaporized water (or other liquid vapors) to the non-adhesive coated side of the label can have dramatic effects in reducing curl.

C. Coated Labels

Figure 1:
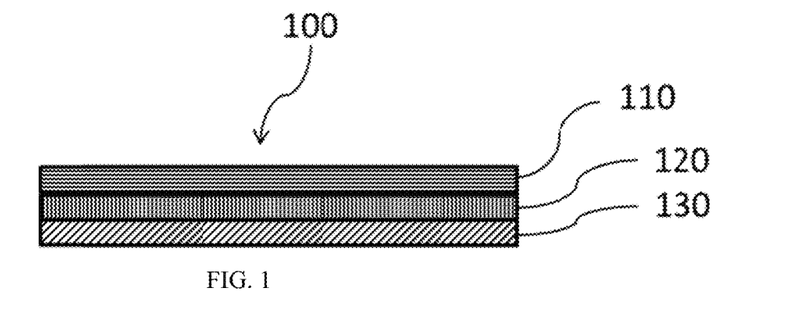
FIG. 1 is a schematic of a cross-section of an exemplary label having three layers: a first layer which is printable, a second layer of a face sheet, and a third adhesive layer of adhesive composition described herein.
Figure 2:
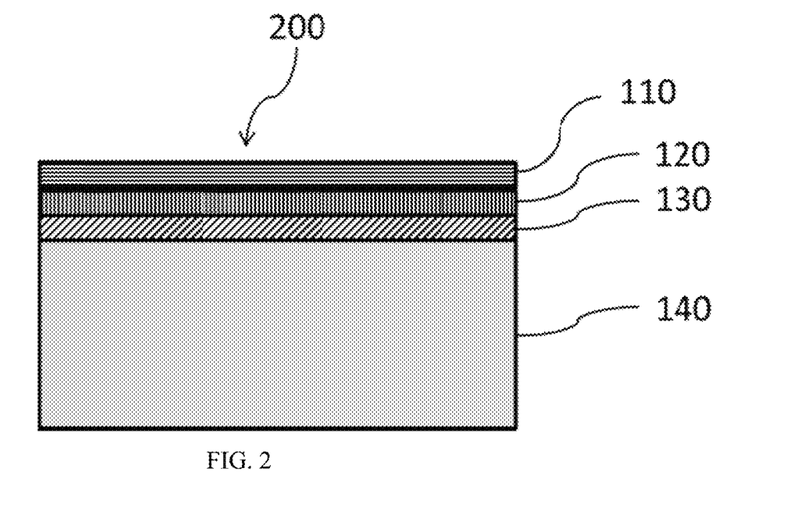
FIG. 2 is a schematic of a cross-section of the exemplary label shown in FIG. 1, which is attached to a substrate.

In one embodiment, the final product is a label 100, such as shown in FIG. 1, having three layers: a first layer which is printable 110, a second layer of a face sheet 120, and then a third layer of adhesive composition 130 described herein, e.g., coated on one surface of the face sheet 120. Preferably, the adhesive composition is in the form of a continuous phase composed of a homogenous mix of all adhesive polymers. In some embodiments, the continuous phase composed of a homogenous mix of all adhesive polymers contains a uniform dispersion of the filler. In some embodiments, the filler particles are localized to the surface of the film; in others, they are localized to the interface between the paper and the adhesive or distributed uniformly in the z-axis. In all embodiments, the adhesive portion of the liner-free label is in a non-tacky state prior to activation by the activating solution. Prior to applying the label 100 to a substrate 140, the layer of adhesive composition 130 is activated with an activating fluid and applied to the substrate 140 to form a label-substrate system 200. See FIG. 2. In this configuration, the printable layer 110 forms the outermost layer.

D. Adhesive Compositions

As used herein, the term "adhesive composition" refers to a composition that is fluid activatable. Prior to activation, the adhesive composition is non-tacky. Immediately following activation, the adhesive composition is tacky. The adhesive composition dries to a non-tacky state after activation.

The adhesive compositions described herein can contain a single polymer (e.g., homopolymers, copolymer, terpolymer, etc.) or a mixture of polymers, such as homopolymers, copolymers, terpolymers, etc., and combinations thereof. Additives, such as hygroscopic particulate fillers, can be incorporated into the adhesive composition for the generation of both quick tack and longer term adhesion upon activation by an aqueous or solvent-based solution for adhesion to a variety of substrates, such as paper, cardboard, metal, as well as glass and plastics, particularly glass and polyethylene terephthalate substrates, such as bottles.

Hygroscopic agents (e.g., particulate fillers) in the adhesive formulations can modulate the kinetics of the distribution of water and/or the activation fluid throughout the adhesion composition to achieve the desired adhesive behavior and performance of the glue-free, liner-free label. Kinetics may also be modified by the degree of hydrophilicity and hydrophobicity of the polymers in the adhesive layer.

1. Emulsion Polymer

The adhesive composition contains an emulsion polymer. The emulsion polymer provides the adhesion of the label to the substrate. The emulsion polymer can adhere to the surface through a variety of interactions/mechanisms, including, but not limited to, hydrogen bonding or other intermolecular forces, such as hydrophobic interactions.

The emulsion polymer typically contains one or more monomers, preferably at least one monomer is 2-acrylamido-2-methylpropane sulfonic (AMPS) acid, a salt of AMPS, or a combination thereof. Optionally, the emulsion polymer contains one or more additional monomers, such as butyl acrylate, 2-ethylhexyl acrylate, methyl acrylate, styrene, or a combination thereof.

In preferred embodiments, AMPS, a salt of AMPS, such as its sodium salt, or combinations thereof, comprise from about 1.0% wt/wt to about 45.0% wt/wt of the polymer, more preferably from about 10.0% wt/wt to about 20.0% wt/wt of the polymer, such as 10.0% wt/wt, 11.0% wt/wt, 12.0% wt/wt, 13.0% wt/wt, 14.0% wt/wt, 15.0% wt/wt, 16.0% wt/wt, 17.0% wt/wt, 18.0% wt/wt, 19.0% wt/wt, and 20.0% wt/wt. In a preferred embodiment, the adhesive composition is non-blocking when dry, without requiring a non-blocking resin. Other salts of AMPS include, but are not limited to, those formed with cations such as ammonium ion, cations of alkali metals (Li, K, Rb, Cs), and alkaline earth metals (Mg, Ca, Sr, Ba).

Other emulsion polymers that can be used include, but are not limited to, styrene acrylic emulsion polymers, natural and reclaimed rubbers, polyurethanes, non-carboxylated and carboxylated styrene-butadiene rubbers, polyacrylates based on the polymerization of monomers of methacrylates, ethyl acrylate, 2-chloroethyl vinyl ether, hydroxyethyl methacrylate, butyl methacrylate or combinations of the previous, polyamides, polyesters, polyolefins, polyolefins containing maleic anhydride, polyvinyl esters, polyvinyl ketones, polydiene elastomers, polyisobutylenes, poly butadienes, polychloroprenes, as well as combinations of the above materials. Other material(s) having the desired long-term adherence characteristic may also be used.

The concentration of the emulsion polymer can vary depending on the adhesion and tack of the emulsion polymer and the optional continuous phase formation of the resin polymer, if present. In some embodiments, the emulsion polymer is present in an amount of about 40% or greater by weight/weight of the adhesive composition, such as about 50% to about 90% by weight/weight, preferably 50% to about 80%, preferably 60% to about 80% by weight/weight. The concentration of the optional resin can be less than 40% or greater than 90% weight/weight of the adhesive composition in view of the requirements/properties discussed above for the resin and the emulsion polymer. The concentration of the resin and/or emulsion polymer can be varied due to the presence of additives which modify the properties of the adhesive composition.

2. Polymer Blends/Mixtures

In some embodiments, the adhesive composition contains a blend or mixture of a polymeric resin and an emulsion polymer. The polymers can be homopolymers, copolymers, terpolymers, etc., and combinations thereof. In particular embodiments, the blend or mixture contains an emulsion polymer which provides adhesion to the substrate, and optionally a non-blocking resin in a continuous film that provides a non-blocking surface. The blend of the emulsion polymer into the non-blocking resin disrupts the polymer film and allows for improved activation of the film by the activation spray.

The emulsion polymers discussed above can be used in the blend or mixture described in this section.

a. Polymeric Resin

The blends may contain a continuous phase, film-forming polymeric resin (also referred to herein as "the resin", "polymeric resin", the "film-forming resin", "non-blocking resin", and "resin polymer"). The resin should be non-blocking. The film-forming polymeric resin can be water-soluble or insoluble, alkali soluble, or combinations thereof. In particular embodiments, the resin is water-insoluble which provides resistance to label removal when immersed in a cold water bath but is alkali soluble which allows for removal of the label facilitating recycling of the substrate (e.g., glass or plastic container, such as a bottle).

In these embodiments, the resin polymer should form a continuous phase in which the other components of the adhesive composition (e.g., emulsion polymer, etc.) are dispersed when dried. The film-forming resin encapsulates the emulsion polymer to provide a non-tacky surface which allows for storage of the labels as rolls or stacks. However, the blend of the emulsion polymer into the non-blocking resin disrupts the continuous polymer film and allows for improved activation of the film by the activation spray to provide the necessary adhesion to affix the label to the substrate. The emulsion polymer is generally hydrophobic or more hydrophobic than the resin polymer. This arrangement allows for any tack found in the emulsion polymers to be hidden from the surface of the film by the continuous phase polymer, which will prevent blocking. These polymers should be non-tacky and either fully or partially soluble in the activation spray.

For increased humidity resistance, resin polymer or polymers that are soluble in alkaline or acidic aqueous environments, but insoluble in aqueous environment at neutral pH, and have some sensitivity to solvent is preferred since environmental moisture will have no effect on their physical properties. The pH-dependent solubility of the resin polymers improves coating stability and sensitivity to solvent facilitates activation.

Suitable resins include, but are not limited to, styrene-maleic anhydride resins, esters of styrene-maleic anhydride resin, styrene-maleic anhydride amic acid resin, styrene-maleic anhydride imide resin, ammonium and alkali metal salts of styrene-maleic anhydride resin, polymers based on polyvinyl acetate, copolymers of polyvinyl pyrrolidone, and acrylic copolymers of styrene and acrylic acid, polystyrene acrylic resins, polyvinyl alcohols, polyvinyl acetates, polyvinylpyrrolidones, polyvinylpyrrolidone-vinyl acetate copolymers, polyacrylic acids, polyethylene glycols, poly(2-ethyl-2-oxazoline), polyacrylamide copolymers, ethylene vinyl acetates, cellulose derivatives, particularly alkyl cellulose derivatives (cellulose acetate, methyl cellulose, ethyl/hydroxyethyl, hydroxymethylpropyl cellulose, etc.), ureas, gelatins, alginates, agars, gum arabics, and other similar materials as well as combinations of the above materials. In particular embodiments, the resin is or includes styrene-maleic anhydride, a polystyrene acrylic resin, or both.

Suitable solvent choices for solubilizing the alkaline soluble resin include, but are not limited to, aqueous solutions of sodium hydroxide, potassium hydroxide, ammonium hydroxide, monoethanolamine, diethanolamine, triethanolamine, primary amino alcohols, for example; 2-amino-2-methyl-1-propanol, 2-amino-1-butanol, tris(hydroxymethyl)-aminomethane, and 2-amino-2-ethyl-1,3-propanediol, and additionally, ethylamine and propylamine.

The concentration of the resin can vary depending on the adhesion and tack of the emulsion polymer and the continuous phase formation of the resin polymer. If the emulsion polymer is relatively non-tacky/blocky, then less resin polymer can be used. In contrast, if the emulsion polymer is very tacky, more resin polymer is likely needed. The other required properties of the label also need to be considered (e.g., caustic resolubility, ice water resistance, manufacturability, etc.). In some embodiments, the resin polymer is present in an amount of about 75% or less by weight of the adhesive composition, such as about 10% to about 70% by weight, preferably 25% to about 65%, preferably 30% to about 60% by weight. The concentration of the resin can be less than 10% or greater than 75% in view of the requirements/properties discussed above.

Volatile-base neutralized resin solutions are used to prepare aqueous solutions of the non-blocking polymer resin that dries to form a water-insoluble film due to the evaporation of the base. The resin provides the desired ice water resistance. The sensitivity of the resin to base allows for caustic removability of the label due to the dissolution of the polymer in the base, which is important for recycling and removal applications. The use of a non-volatile base that remains in the polymeric film results in a loss of ice water resistance.

3. Polymer Properties

The resin, emulsion polymer, and/or copolymer can vary in terms of molecular weight, acid number, and/or glass transition temperature based on the monomers use to form the polymers. In some embodiments, the weight average molecular weight of the resin and/or emulsion polymer is from about 5,000 Daltons to 1,000,000 Dalton, preferably from about 5,000 Daltons to about 500,000 Daltons, more preferably from about 5,000 Daltons to about 250,000 Daltons. In some embodiments, the weight average molecular weight is from about 5,000 Dalton to about 30,000 Daltons. In other embodiments, the weight average molecular weight is greater than about 200,000 Daltons.

For those polymers containing acidic functional groups, such as acrylic acid monomers, the acidity of the polymer can be measured by determining the acid number. In those embodiments where the adhesive composition contains an alkaline soluble resin and an emulsion or dispersion polymer, the resin has an acid number from about 75 mg KOH/g polymer to about 500 mg KOH/g polymer, preferably from about 100 mg KOH/g polymer to about 250 mg KOH/g polymer and the emulsion/dispersion polymer has an acid number from about 0 mg KOH/g polymer to about 70 mg KOH/g polymer, preferably from about 40 mg KOH/g polymer to about 60 mg KOH/g polymer.

The glass transition temperature of the polymer typically varies from about −50° C. to about 200° C. In some embodiments, the glass transition temperature is from about −50° C. to about −15° C., from 0° C. to about 10° C., from about 40° C. to about 90° C. or from about 200° C. to about 225° C. In those embodiments where the adhesive composition contains an alkaline soluble resin and an emulsion or dispersion polymer, the resin has a Tg from about 40° C. to about 160° C., preferably from about 100° C. to about 130° C. and the emulsion polymer has a Tg from about +10° C. to about −80° C., preferably from about −10° C. to about −60° C., more preferably from about −15° C. to about −50° C. In general, higher Tg polymers will have better heat-seal blocking resistance but the use of lower Tg emulsion polymers is suitable if the emulsion polymer is entrapped within a continuous phase of a higher Tg alkaline soluble resin.

E. Hygroscopic Particulate Fillers

Hygroscopic particulate fillers can be added to the composition to enhance the adhesive performance of the hydrophobic and hydrophilic materials. The use of such hygroscopic agents is beneficial as a means to enhance the penetration of water into the adhesive layer on a label as well as to control the kinetics of adhesive activation based on the distribution and redistribution of the activation fluid (or solvent) into both the hydrophilic and hydrophobic regions of the adhesive. In order for the adhesives to transition from their non-tacky to tacky state, they require a certain amount of water and/or solvent moisture to be present within the material. The retention of this moisture can be utilized as a mechanism to preserve viscoelastic flow of the polymer layer and in turn create a tacky label. However, excessive moisture can prevent the contact of the adhesive with the substrate by acting as a physical barrier to the generation of adhesive interactions resulting in the migration of the label from the desired application area on a substrate during down-stream processing. An added benefit of the use of hygroscopic agents is their ability to reduce the phenomena of 'blocking' in self-wound rolls of labels having a surface coated with the adhesive composition described herein.

These hygroscopic particulate filler materials are typically available as colloidal suspensions in a variety of solvents or as solids and are incorporated into the final adhesive composition at the desired concentrations. Concentrations of the suspensions are typically in the range of 10% to 90% solids (weight of solids in the suspension to volume of liquid phase of suspension) in either an aqueous or solvent based suspension and present in the final dry film in a ratio from 1% to 25% (weight of dry solids in film as a ratio of other components dry weight in film). However, concentrations below or above this range are possible depending on the composition and/or the desired application.

Care should be taken to prevent the flocculation of these hygroscopic agents during adhesive preparation and storage since these agents are often micro- and nanoparticles, which are prone to aggregation due to their high surface area to volume ratios. Generally, particles within the particulate fillers may have the largest particle dimension between 0.005 µm (micrometers) and 15 µm, more preferably between 0.005 µm and 10 µm, and most preferably between 0.005 µm and 5 µm. As used herein, the term "largest particle dimension" refers to the longest linear dimension between two points on the particle.

Methods to ensure the homogenous distribution of these agents in suspension can include the use of agitation, surfactants, temperature and/or pH. The pre-saturation or treatment of the hygroscopic agents using solvents, water, and/or adhesive components is also possible to alter their affinity for different components of the activating solution.

Suitable hygroscopic particulate fillers include, but are not limited to, alumina, alumina gel, boehmite, pseudoboehmite, clay, calcium carbonate, chalk, magnesium carbonate, kaolin, calcined clay, pyropylate, bentonite, zeolite, talc, silica, silica gel, synthetic aluminum silicates, synthetic calcium silicates, diatomatious earth, anhydrous silicic acid powder, aluminum hydroxide, barite, barium sulfate, gypsum, calcium sulfate, and organic particles, such as hydrophilic and/or hydrophobic polymeric beads including but not limited to polyamides, polyvinyl alcohol, polyvinylpyrrolidone, polyvinylpyrrolidone vinyl acetate and other similar materials as well as combinations of the above materials.

F. Polymer Solvents

Solvent(s) can be added to the composition as means for formulating the one or more polymers. For example, solvent(s) can be added to mirror the composition of the solution of the activating fluid to enhance the rapid swelling of the label and quick tack adhesion forces following the exposure of the adhesive layer to the activating fluid. By including the chemistry of the activating solution during the deposition process, the surface of the adhesive can be modified to promote the penetration of the activating solution into the adhesive layer for activation. Furthermore, the incorporation of solvents, particularly those that are less viscous and/or have higher vapor pressures, allows for the deposition of more consistent and uniform adhesive films on the labels. Furthermore, some solvents may be able to prevent any adverse effects of the adhesive layer deposition process on the front side of the label, which must remain pristine for optimal label print quality.

Care must be taken to insure that the solvent selected does not damage or deform the substrate being coated. In one embodiment, thermally activated paper is coated with a water based solvent system as primary alcohol, glycols, and acetates tend to damage or activate the thermal ink. Solvents may include, but are not limited to, water, ethanol, isopropanol, n-propanol, methyl ethyl ketone, toluene, methylene chloride, and/or coalescing agents including polyethylene glycol, glycol ethers, and fatty alcohols. In some embodiments, the one or more polymers are formulated as a water-based emulsion or dispersion.

G. Activating Fluids

The activating fluid composition provides optimal activation of the adhesive component(s) of the layer of adhesive composition of the liner-free label. The activating fluid composition must penetrate into the adhesive layer to moisten the hydrophilic and hydrophobic adhesive monomers without over-wetting the adhesive surface of the label, which can compromise adhesive performance. In addition, the activating fluid composition needs to be compatible with mechanisms for applying activating fluids onto a liner-free label, such as in stand-alone systems, label printers, labeling lines, or other apparatuses. The activating fluid composition should also be safe, non-toxic and comply with the guidelines established by regulatory boards for their intended purpose.

The purpose of the activating fluid (or solution) is to introduce moisture into the adhesive layer to allow for the conversion of the adhesive from its non-tacky to tacky state. However, given the selection of both hydrophilic and hydrophobic adhesive monomers, one must account for the chemistries of the two or more polymers and the solvent used in the deposition process for enabling optimal activation. As described previously, the activating fluid needs to penetrate into the hydrophilic regions of the adhesive layer to generate quick tack then redistribute and remain in the hydrophobic regions to maintain ultimate tack and long-term adhesion.

Suitable solvents include, but are not limited to, water; acetone; acetonitrile; lower alcohols (i.e., having from 1-10 carbons) including, but not limited to, methanol, ethanol, isopropyl alcohol, n-propanol, n-butanol, 2-butanol, isobutanol, 2-methy-2-butanol, n-pentanol, n-hexanol, 2-hexanol, cyclohexanol, n-heptanol, n-octanol, n-nonanol, n-decanol; glycols including, but not limited to, propylene glycol, ethylene glycol, and butylene glycol; fatty alcohols (i.e., having more than 10 carbons) including, but not limited to, undecanol, dodecanol, 1-tetradecanol, arachidyl alcohol, docosanol, tetracosanol, hexacosanol, octanosol, triacontanol, cetyl alcohol, stearyl alcohol, and polycosinol; ketones, such as methyl ethyl ketone; esters, such as lower (i.e., having from 1-10 carbons) acetates including, but not limited to, methyl acetate, ethyl acetate, n-propyl acetate, isopropyl acetate, isobutyl acetate, sec-Butyl acetate, tert-Butyl acetate, 3-methyl-1-butyl acetate; mineral spirits; oils, such as linseed oil and vegetable oil; citrus based solvents, such as limonene, other primary, secondary, and tertiary alcohols, and combinations thereof.

Low volatile solvents, such as ethylene glycol and propylene glycol, are particularly useful in extending the latency period.

Low surface energy solvents, such as isopropyl alcohol are particularly effective in increasing wet out on hydrophobic and/or low surface energy substrates.

The polymer selection for the adhesive formulation can be such that the activation solvent required to activate the label is water. However, selecting polymers that only require water to rapidly transition from non-tacky to active may not be desirable as the finished labels are highly vulnerable to blocking due to absorption of atmospheric moisture, causing a transition from the non-tacky state to the tacky state.

Therefore, in one embodiment, the activating fluid contains at least two or more solvents. The first solvent or component is water or an aqueous solution which allows for rapid wetting and swelling of the hydrophilic regions of the adhesive to generate the quick tack responsible for the initial adhesion of the label to the substrate. However, as the water is drawn into the hygroscopic filler, quick tack is lost and must be replaced by ultimate or long-term tack, derived from the hydrophobic regions, which exhibit some swelling behavior in water. Thus, a second solvent or component is a non-aqueous (non-water) solvent containing hydrophobic chemical moieties which enhances the activation of the hydrophobic regions by increasing the permeability of the activating fluid into these regions. In a particular embodiment, the non-aqueous solvent is partly miscible or fully miscible with water. By using a mixture of solvents, the swelling of the hydrophilic regions can increase the surface area of the hydrophobic regions exposed for solvent penetration, resulting in the more rapid generation of ultimate tack. An optional third solvent or component, which preferably is a volatile material, may be used to aid in the removal of excess moisture from the adhesive layer to promote stronger adhesion.

In one embodiment, the solvent contains between about 1% and about 70%, preferably about 5% to about 70%, more preferably from about 10% to about 60%, most preferably about 10% to about 50% by weight of a non-toxic organic solvent in an aqueous solution. Care should be taken to match the polymer adhesive layer with suitable solvents that will activate the layer within the parameters discussed above. In a particular embodiment, the activation composition is a mixed solvent system with 5-70% w/w alcohol in water, preferably 10-50%, more preferably 20-40%, most preferably about 30% w/w mix of an alcohol in water. However, any polar solvent with some water miscibility containing hydrophobic chemical moieties may also be used. In particular embodiments, the solvent is a mixture of water and n-propanol, isopropanol, or combinations thereof. The concentration of the alcohol(s) can be about 1%, 2%, 5%, 10%, 15%, 20%, 25%, 30%, 35%, or 40% by weight of the fluid.

The solvent system can be varied for a particular adhesive composition in order to vary the properties of the adhesive composition. For example, the examples below show that the activating solvent can be varied to correlate with the selected hydrophilic and/or hydrophobic materials to achieve the desired performance. Generally, a solvent is a liquid fluid that either solubilizes or swells polymeric components of a solvent sensitive film. A non-solvent is a liquid fluid that does not solubilize or swell the polymeric components of a solvent sensitive film. In one embodiment, non-solvent can be incorporated into the activation fluid to reduce the overall average peel adhesion of the label. In another embodiment, solvent with a vapor pressure greater than that of water at a given temperature can be incorporated into the activation fluid to lower the amount of time required to achieve acceptable ultimate adhesion values.

To decrease surface tension, enhance solvent spreading on the adhesive film surface, and/or promote activating solvent penetration, surfactants may be added to the activating fluid. Surfactants may also help in the delivery of the activating fluid by allowing for the creation of finer mists with smaller particle sizes during atomization (when used to apply the activating fluid to the adhesive layer of a label) which can promote adhesive activation by increasing the surface area for the interaction between the activating solution and the adhesive layer. Classes of surfactants that can be used include anionic, cationic, non-ionic and amphoteric surfactants. Specific examples include lecithin, Span™-60, Span™-80, Span™-65, Tween™-20, Tween™-40, Tween™-60, Dynol™ 604 (Air Products), Surfynol™ (Air Products), Pluronics™ (BASF, Germany), Polysorbates™ (Tween™), Sodium dodecyl sulfate (sodium lauryl sulfate), Lauryl dimethyl amine oxide, Cetyltrimethylammonium bromide (CTAB), Polyethoxylated alcohols, Polyoxyethylene sorbitan, Octoxynol™ (Triton X100™), N, N-dimethyl-dodecylamine-N-oxide, Hexadecyl-trimethylammonium bromide (HTAB), Polyoxyl 10 lauryl ether, Brij™ 721™, Bile salts (sodium deoxycholate, sodium cholate), Polyoxyl castor oil (Cremophor™), Nonylphenol ethoxylate (Tergitol™), Cyclodextrins, Lecithin, or Methylbenzethonium chloride (Hyamine™).

H. Other Additives

Additives may incorporated into activating fluid, such as acids, bases, buffers, antimicrobial agents, stabilizers, emulsifiers, and/or defoaming agents, as needed for the particular application.

Other additives may be added into the adhesive composition to modulate the performance of the liner-free labels. These additives may be selected for a variety of purposes, such as enhancing water penetration, reducing blocking, increasing quick tack and/or long-term adhesion as well as improving latency (the time between label activation and application). Potential classes of additives include, but are not limited to, colorants, both dye and pigment based, salts, sugars, other carbohydrates, polyelectrolytes, proteins, dry and liquid surfactants, resins, wetting agents, additive that provide desired lay flat properties of the labels, such as humectants, polyethylene glycol, and/or salts, other similar materials as well as combinations thereof. These additives can be incorporated into one or both of the polymer components, the polymer solvent, the activating fluid, or combinations thereof.

In particular, the use of non-volatile solvents, plasticizers, coalescents, oligomers, and/or polymers in the activation may extend the open time of a given adhesive composition. The additives in the activation spray should not clog the applicator used to apply the activation spray and should not require excessive cleanup.

I. Adhesive Performance

The performance of the adhesive composition can be evaluated using a variety of assays including block resistance (room temperature or heat seal), room temperature quick tack, cold temperature quick tack, peel strength, percent fiber tear and label edge peel, tunneling, and/or swimming when immersed in an ice bath. The performance of the adhesive composition in the peel strength, percent fiber tear and immersion assays can vary depending on the activating fluid used to activate the adhesive. Results from room temperature quick tack, cold bottle quick tack and blocking (performed at room temperature) assays on a variety of adhesive compositions are shown in Table 1 in the Examples.

The labels coated with the adhesive compositions described herein preferably exhibit:

(1) a peel rating of good or excellent, preferably excellent, at two minutes;

(2) a room temperature blocking of good or excellent, preferably excellent, which indicates no interaction of the face sheet with the non-tacky adhesive applied to the backside of the sheet;

(3) a room temperature quick tack rating of at least 80%, at least 85%, or at least 90%, and up to 100%, indicating that the adhesive compositions attach to a substrate at room temperature, when the surface of the substrate is dry or wet;

(4) a cold bottle quick tack rating ranging from at least 80%, at least 85%, or at least 90%, and up to 100%, indicating that the adhesive composition attaches to a substrate at cold temperatures, where the surface of the substrate is dry or wet; or (5) combinations thereof.

In a particularly preferred embodiment, the adhesive composition exhibits all of the properties (1-4) listed above.

The blocking test is predictive of how the non-tacky adhesive coating will behave following the coating production step when face sheets stock is kept in roll form prior to converting to sheet form. Ratings of excellent provide for face sheet rolls with no blocking and unwind easily with no damage to face sheet or adhesive coatings.

III. Kits

Kits containing the adhesive composition or the components to prepare the adhesive compositions are described herein. In one embodiment, the kit contains, a premixed blend or mixture of polymers, such as homopolymers, copolymers, terpolymers, etc., preferably the blend or mixture of polymers includes an emulsion polymer containing 2-acrylamido-2-methylpropane sulfonic acid (AMPS), a salt of AMPS, such as its sodium salt, or a combination thereof, optionally with one or more additional monomers, such as butyl acrylate, 2-ethylhexyl acrylate, methyl acrylate, styrene, or a combination thereof. Optionally, the kit contains an alkaline soluble resin, as well as any additives. The blend or mixture can be in the form of a solution or suspension in a suitable solvent or an emulsion. Alternatively, the blend or mixture can be a solid, which is formulated into a solution, suspension, or emulsion by the user. In these embodiments, the kit can contain one or more solvents for formulating the adhesive composition.

The one or more polymers, additives, and/or solvents can be provided in appropriate containers, such as drums or totes.

The kit may also contain instructions for preparing the adhesive composition as well as instructions for applying it to labels. The kit can also contain the activating solution, which is packaged in a separate container, such as a drum or tote. The activating solution may contain one or more additives solubilized or dispersed in the activating solution. Alternatively, the additives can be added to the activating solution prior to use.

In other embodiments, the kit contains the adhesive composition, optionally any additives, and the activating fluid, where the adhesive composition and the activating fluid are packaged and/or delivered separately but are used in combination to prepare liner-less labels.

In some embodiments, the adhesive composition and the activating solution are provided or sold to an entity that applies the adhesive composition to labels and sells the treated labels and the activating solution to the final end user. The entity that sells the treated labels and the activating solution to the final end user can package the labels and activating solution with a printing/labeling device, fitted with an aftermarket device to activate the labels, used to print the labels and/or apply them to commercial products. In another embodiment, finished labels, where the adhesive composition has been applied prior to packaging of the labels, are provided.

In specific embodiments, kits are sold to label coaters/manufacturers. The kits can contain one or more of the following: (1) drums, pails, totes, or other bulk containers containing an adhesive composition to be coated onto a face sheet using a large format web-based coater or printing press or sheet fed printing press; (2) drums, pails, totes, or other bulk containers containing an activation fluid to be repackaged into refill stations, reusable containers, or disposable cartridges; (3) refill stations, reusable containers, or disposable cartridges containing activation fluid; (4) wide format rolls or stacks of liner-free labels; and combinations thereof. The elements of the kit can be sold to a single coater/manufacturer or to multiple coaters/manufacturers.

The KRONES Manual of Labeling Technology (Hermann Kronseder Maschinenfabrik, 1978) lists various automated labeling methods that have become increasingly ubiquitous within industry since its publishing. The glue-free, liner-free labels described herein are engineered to be compatible with these methods as well as more modern methods known to one of ordinary skill in the art. In particular, these labels are compatible with existing cut and stack glue applied labeling machines with simple retrofits to the machinery.

IV. Methods of Making Adhesive Compositions

The one or more polymers in the final adhesive composition, preferably at least one emulsion polymer, can be packaged individually, along with one or more solvents, and mixed together at a later time. Alternatively, the one or more polymers can be mixed together to form a blend and dissolved or suspended in a solvent in the form of an emulsion, suspension, or solution. Prior to the preparation of the final adhesive composition, all formulations can be diluted to the desired concentrations with distilled water or appropriate organic solvent.

The desired coating concentration of the formulations is from about 20% wt/wt solids to about 70% wt/wt solids, preferably from about 20% wt/wt solids to about 60% wt/wt solids, more preferably from about or between 25% wt/wt solids and 55% wt/wt solids. Depending on the particular combination of components in the adhesive compositions, the polymer(s) and any additives are mixed together in the appropriate ratios. For example, if the hygroscopic particulate filler to be added is in the form of a colloidal suspension, the one or more polymers can be mixed into this suspension; if the hygroscopic agent is a solid, it can be added to the one or more polymers.

V. Methods of Using Adhesive Compositions

The adhesive compositions described herein can be used to adhere glue-free, liner-free labels to a variety of substrates, particularly glass and plastic, such as polyethylene terephthalate. In particular embodiments, the adhesive composition is applied to a printed or printable paper or polymeric film for application to glass or plastic, such as food and beverage bottles and containers, containers for pharmaceutical products, or other storage or consumer containers made from or of glass or plastics. The adhesive compositions typically show good or excellent room temperature quick tack to wet or dry surfaces of the substrate to which the adhesive composition is applied; good or excellent cold bottle quick tack to wet or dry surfaces of the substrate to which the adhesive composition; good or excellent room temperature non-blocking to a substrate when the adhesive composition and the surface of the substrate to which the adhesive composition is applied are dry; or combinations thereof.

The labels provide long term label to bottle adhesion when dry. In some embodiments, the labels also provide long term adhesion when exposed to ice water conditions for extended time periods (e.g. greater than 2 hours, greater than 12 hours, greater than 24 hours, greater than 48 hours, and up to about 72 hours), particularly for substrates having high MVTR values. This is particularly useful for food and beverage bottles and containers which are stored in ice, such as in coolers. The labels, however, are typically easily removable in a caustic bath which allows for straightforward label removal and recycling of the glass or plastic container.

In addition, the compositions, methods, and kits described herein eliminate the need for an extra silicone release layer, which is typically disposed on a liner backing in a liner-backed pressure sensitive adhesive (PSA) label or on the top of a printed layer of in a liner-less PSA label. In these labeling systems, the silicone presents an energy intensive manufacturing process and the addition of a petrochemical derivative product that is unnecessary and eliminated by the compositions, methods, and kits described herein, thereby reducing the carbon footprint of the label and the requirement for silicone to be utilized in the label manufacturing process. The system described herein also eliminates the need for wet or hot glue application processes, which avoids the necessary extensive cleaning as the glue dries and accumulates on bottling line equipment.

EXAMPLES

Examples 1-18. Preparation of Non-Tacky, Label Samples for Block Testing, Quick Tack Cold Bottle Testing, and Quick Tack Room Temperature Testing Materials and Methods All materials were purchased from Sigma-Aldrich.

Preparation of Emulsions

To a nitrogen-purged, 1 L jacketed glass reactor equipped with a controlled temperature recirculator was charged 366.26 g of deionized water, 1.22 g surfactant, and 110.56 g of a 45% (w/w) solution potassium hydroxide in water. This mixture was brought to 85° C. and, upon complete dissolution of the base (KOH), 225.96 g of styrene acrylic beads were added in one portion. This was allowed to stir at 300 rpm at 85° C. for 2 to 2.5 hours or until complete dissolution of the polymer beads, thereby forming a support resin, which acts as a high molecular weight surfactant to help form the final emulsion. To this uniform mixture, 1.58 g of ammonium persulfate as free radical initiator was charged in one portion and, immediately after initiator addition, the monomers listed in Table 1 were introduced dropwise using a syringe pump at a rate sufficient to equal a total addition time of 195 minutes. Upon completion, the polymerization was allowed to continue for an additional 30 minutes. After 30 minutes, the remaining 0.23 g of initiator was charged and allowed to continue polymerization for an additional 60 minutes. At this time, the temperature was dropped to 75° C. and the t-butoxyperoxide and sodium erythorbate solutions were added dropwise via a syringe pump over 60 minutes. After this addition is complete, the reaction mixture was allowed to stir for a final 60 minutes before cooling the reaction and filtering.

Preparation of Non-Tacky, Label Samples

Emulsion polymers used in Examples 1 to 18 are described in Table 1. Non-tacky, label samples were coated on the backside of wet strength 70 g/m$^2$ paper stock with a wire wound rod to achieve a coating film weight of approximately 8 g/m$^2$ and dried for 20 sec through a conveyor oven at approximately 93° C. sample temperature.

Koehler Blocking Test

Label sample strips, cut to 3.8 cm×15.2 cm, were placed in a Koehler I.C. Variable Pressure Block Tester (catalog No. K53000, Koehler Instrument Company, Bohemia, N.Y.) with the non-tacky, adhesive layer oriented down on top of the face sheet of a 3.8 cm×15.2 cm sample strip. The label samples were treated for 24 hours at 22° C. to 25° C. (room temperature) and 60 psi. After testing, the samples were peeled apart. Sample evaluation was based on the level of interaction the adhesive coating had for the face stock of the paper label. Samples with no interaction received a rating of Excellent. Samples with a low level of interaction received a rating of Good, while samples with a high level of interaction resulting in visible damage to the label face stock coating received a rating of Fair. Samples with the greatest amount of interaction, resulting in paper tear of the label, received a rating of Poor.

Quick Tack Protocol for Cold Bottle and Room Temperature Bottle Application

The adhesive side of coated label samples, cut to 5 cm×2.9 cm, were sprayed with 6 mg/in$^2$ (0.93 mg/cm$^2$) of activation spray. Within 200 msec to 500 msec of spraying, the labels were applied to glass bottles chilled to temperatures between 2° C. and 4° C. in a refrigerator set to −5° C. for a minimum of 12 hr. The glass bottles were 61 mm length and had an outer diameter of 28 mm. The labels were allowed to set for 90 sec prior to measurements. The length of the label adhered to the bottle was measured and recorded as a percent of the maximum possible label adhesion.

Five samples were tested for each label, and the average is reported in Table 1.

Labels with >80% adhesion are considered excellent and predictive of labels with a high success rate of adhesion to room temperature, room temperature and wet, cold, or cold and wet beverage bottles on large scale commercial bottling machines.

Labels with <80% adhesion are not considered to be favorable candidates for room temperature, room temperature and wet, cold, or cold and wet bottle applications. Fast quick tack with the high percent adhesion are important properties of beverage labels as the typical time required for labels to generate sufficient tack on a typical bottling line can be on the order of 150 msec to 300 msec.

For room temperature bottle applications the above procedure was conducted with glass bottles acclimated to room temperature (22° C. to 25° C.) for a minimum of 24 hours.

Results

Each of the label samples presented in Table 1 were non-tacky as indicated by the excellent and good ratings from the Koehler blocking test. All label samples presented in Table 1 had good adhesion to room temperature bottles. Advantages of label samples containing 2-acrylamido-2-methylpropane sulfonic acid (AMPS) in the emulsion polymerization are indicated by the >80% Cold Bottle Quick Tack measurements. AMPS monomer loading in the emulsion polymerization was tested from 0% wt/wt to 50% wt/wt of the polymer, with a sampling of acrylate monomers of varying Tg. When the AMPS monomer is polymerized at a level of 10% wt/wt to 20% wt/wt (Examples 4, 7 to 11, 16 to 18) the cold bottle label adhesion was excellent, while levels of 5% wt/wt and 0% wt/wt AMPS showed no adhesion to cold bottle (Examples 1-3) or very low adhesion (Examples 5, 6, and 15). AMPS level of 25% wt/wt (Example 12) resulted in poor cold bottle adhesion. When AMPS was loaded at 50% wt/wt the polymerization gelled and did not run to completion (Examples 13 and 14). AMPS loadings within the range of 10% wt/wt and 20% wt/wt achieved the best cold bottle label adhesions when copolymerized with any of the acrylate monomers and styrene monomers described in Table 1. The data also indicate that good or excellent tack at cold bottle temperatures also gives rise to good or excellent tack at room temperature.

TABLE 1

Room temperature tack, cold bottle tack and blocking tests for the labels coated with adhesives prepared using the percent composition (wt/wt) of the monomers shown

| Monomers[a] | EXAMPLES | | | | | | | | |
|---|---|---|---|---|---|---|---|---|---|
| | 1 | 2 | 3 | 4 | 5 | 6 | 7 | 8 | 9 |
| Butyl acrylate | 63.0% | 91.0% | 87.5% | 90.0% | 0.0% | 25.0% | 56.7% | 0.0% | 85.0% |
| 2-ethylhexyl acrylate | 28.0% | 0.0% | 0.0% | 0.0% | 0.0% | 0.0% | 25.2% | 90.0% | 0.0% |
| Methyl acrylate | 9.0% | 9.0% | 12.5% | 0.0% | 100% | 75.0% | 0.8% | 0.0% | 0.0% |
| AMPS[b], sodium salt | 0.0% | 0.0% | 0.0% | 10.0% | 0.0% | 0.0% | 10.0% | 10.0% | 15.0% |
| Styrene | 0.0% | 0.0% | 0.0% | 0.0% | 0.0% | 0.0% | 0.0% | 0.0% | 0.0% |
| Room Temperature Quick Tack | 93% | 90% | 91% | 95% | 83% | 82% | 94% | 90% | 94% |
| Cold bottle Quick Tack | 0% | 0% | 0% | 94% | 70% | 70% | 92% | 90% | 89% |
| Koehler Blocking Test | Good | Good | Good | Good | Excellent | Excellent | Good | Good | Good |

| Monomers[a] | EXAMPLES | | | | | | | | |
|---|---|---|---|---|---|---|---|---|---|
| | 10 | 11 | 12 | 13 | 14 | 15 | 16 | 17 | 18 |
| Butyl acrylate | 0.0% | 53.5% | 25.0% | 50.0% | 0.0% | 0.0% | 0.0% | 0.0% | 0.0% |
| 2-ethylhexyl acrylate | 85.0% | 23.7% | 25.0% | 0.0% | 50.0% | 0.0% | 0.0% | 0.0% | 0.0% |
| Methyl acrylate | 0.0% | 7.6% | 25.0% | 0.0% | 0.0% | 0.0% | 0.0% | 0.0% | 0.0% |
| AMPS[b], sodium salt | 15.0% | 15.0% | 25.0% | 50.0% | 50.0% | 5.0% | 10.0% | 15.0% | 20.0% |
| Styrene | 0.0% | 0.0% | 0.0% | 0.0% | 0.0% | 95.0% | 90.0% | 85.0% | 80.0% |
| Room Temperature Quick Tack | 96% | 97% | 80% | Polymerization gelled | | 73% | 92% | 91% | 93% |
| Cold bottle Quick Tack | 80% | 83% | 67% | | | 44% | 88% | 86% | 87% |
| Koehler Blocking Test | Good | Good | Good | | | Excellent | Excellent | Excellent | Excellent |

[a]The glass transition temperatures (Tg) of the monomers are butyl acrylate, −54° C.; 2-ethylhexyl acrylate, −50° C.; methyl acrylate 10° C.; styrene 100° C.
[b]2-acrylamido-2-methyl-propane sulfonic acid. For AMPS, the melting point of the AMPS sodium salt is 195° C.

Unless defined otherwise, all technical and scientific terms used herein have the same meanings as commonly understood by one of skill in the art to which the disclosed invention belongs. Publications cited herein and the materials for which they are cited are specifically incorporated by reference.

Those skilled in the art will recognize, or be able to ascertain using no more than routine experimentation, many equivalents to the specific embodiments of the invention described herein. Such equivalents are intended to be encompassed by the following claims.

We claim:

1. A liner-free label comprising a non-tacky polymeric coating on a face sheet, wherein the polymeric coating comprises a polymeric resin and an emulsion polymer comprising one or more monomers selected from the group consisting of 2-acrylamido-2-methylpropane sulfonic (AMPS) acid, a salt of AMPS, and a combination thereof,
wherein the percent composition of AMPS, the salt of AMPS, or the combination thereof is between about 10% wt/wt and about 20% wt/wt of the emulsion polymer; and
wherein the polymeric resin comprises a polymer selected from the group consisting of polystyrene acrylic, styrene-maleic anhydride resins, esters of styrene-maleic anhydride resin, styrene-maleic anhydride amic acid resin, styrene-maleic anhydride imide resin, and ammonium and alkali metal salts of styrene-maleic anhydride resin.

2. The liner-free label of claim 1, wherein the emulsion polymer further comprises one or more monomers selected from the group consisting of butyl acrylate, 2-ethylhexyl acrylate, methyl acrylate, and styrene, and combinations thereof.

3. The liner-free label of claim 1, wherein the face sheet is printed or printable paper, or printed or printable polymeric film.

4. The liner-free label of claim 3, wherein the face sheet is printed or printable paper.

5. The liner-free label of claim 1, wherein the face sheet has a moisture vapor transmission rate of at least about 160 g/m$^2$/24 hr.

6. The liner-free label of claim 1, wherein the label exhibits no blocking after 24 hours at 60 psi and 22-25° C.

7. The liner-free label of claim 1, wherein when the polymeric coating is contacted by an activation fluid comprising water and one or more organic solvents, the polymeric coating becomes tacky, and
wherein following activation with the activation fluid, when the polymeric coating is contacted with a substrate, the face sheet adheres to the substrate when exposed to ice water conditions for up to about 72 hours.

8. The liner-free label of claim 7, wherein the activation fluid comprises 5% to 70% by weight of one or more low boiling alcohol(s).

9. The liner-free label of claim 8, wherein at least one of the low boiling alcohol(s) is n-propanol or isopropanol.

10. The liner-free label of claim 1, wherein when the polymeric coating is contacted by an activation fluid comprising water and one or more organic solvents, the polymeric coating becomes tacky, and
wherein following activation with the activation fluid, when the polymeric coating is contacted with a substrate for at least 60 seconds when the substrate is at a temperature between about −5° C. and about 15° C., at least 80% of the length of the face sheet adheres to the substrate via the polymeric coating.

11. The liner-free label of claim 10, wherein the polymeric coating is not activatable by an activation fluid containing only water.

12. The liner-free label of claim 1, wherein the polymeric resin forms a continuous phase and wherein the emulsion polymer is dispersed in the continuous phase.

13. A method for applying a liner-free label to a substrate, wherein the label comprises a non-tacky polymeric coating on a face sheet, the method comprising:
(a) activating the polymeric coating with an activation fluid comprising water and one or more organic solvents to form a tacky coating, and
(b) contacting the label to the substrate,
wherein the polymeric coating comprises a polymeric resin and an emulsion polymer comprising one or more monomers selected from the group consisting of 2-acrylamido-2-methylpropane sulfonic (AMPS) acid, a salt of AMPS, and a combination thereof,
wherein the percent composition of AMPS, the salt of AMPS, or the combination thereof is between about 10% wt/wt and about 20% wt/wt of the emulsion polymer, and
wherein the polymeric resin comprises a polymer selected from the group consisting of polystyrene acrylic, styrene-maleic anhydride resins, esters of styrene-maleic anhydride resin, styrene-maleic anhydride amic acid resin, styrene-maleic anhydride imide resin, and ammonium and alkali metal salts of styrene-maleic anhydride resin.

14. The method of claim 13, wherein the emulsion polymer further comprises one or more monomers selected from the group consisting of butyl acrylate, 2-ethylhexyl acrylate, methyl acrylate, and styrene, and combinations thereof.

15. The method of claim 13, wherein the substrate is glass or polyethylene terephthalate.

16. The method of claim 13, wherein the substrate is a glass bottle or container.

17. The method of claim 13, wherein prior to step (b), the substrate is at room temperature, at room temperature and wet, cold, or cold and wet.

18. The method of claim 13, wherein the face sheet is printed or printable paper, or printed or printable polymeric film.

19. The method of claim 13, wherein the activation fluid composition comprises 5% to 70% by weight of one or more low boiling alcohol(s).

20. The method of claim 19, wherein at least one low boiling alcohol is n-propanol or isopropanol.

* * * * *